150
United States Patent Office 3,028,396
Patented Apr. 3, 1962

3,028,396
STABILIZED 1-VINYL-2-PYRROLIDONE
COMPOSITIONS
Charles P. Albus, Cleveland, Ohio, and George G. Stoner, Suffern, N.Y., assignors to General Aniline & Film Corporation, New York, N.Y., a corporation of Delaware
No Drawing. Filed Mar. 2, 1960, Ser. No. 12,268
2 Claims. (Cl. 260—326.5)

This invention relates to a new composition of matter consisting of stabilized 1-vinyl-2-pyrrolidone and more specifically to 1-vinyl-2-pyrrolidone containing an addition of one or more substantially insoluble inhibitors comprising hydroxides, alkoxides, sulfides, and carbonates of alkali metals capable of preventing or retarding the autopolymerization of 1-vinyl-2-pyrrolidone.

This application is a continuation in part of application Serial No. 590,398, filed June 11, 1956, now abandoned.

Freshly distilled 1-vinyl-2-pyrrolidone must be either immediately used, refrigerated, or inhibited to prevent autopolymerization, this being indicated by an increase in the viscosity of the monomer, by gelation, or by the formation of a hard, solid mass of polymer, on storage or shipment. Thus, samples of freshly distilled 1-vinyl-2-pyrrolidone contained in clear bottles have been noted to increase progressively in viscosity until a clear, hard, solid polymer was obtained merely on extended storage at room temperature. The tendency of the 1-vinyl-2-pyrrolidone to self-polymerize is accelerated at slightly elevated temperatures such as those encountered during the hot summer months or the temperatures which may be used in the distillation of crude 1-vinyl-2-pyrrolidone to obtain a relatively pure monomer. For example, instances of bulk or mass polymerization in the distillation pot have occurred when 1-vinyl-2-pyrrolidone was distilled for an extended period at elevated temperatures. A means for refrigerating the monomer is in many instances either unavailable, inconvenient, or unpractical so that recourse must be made to an autopolymerization inhibitor. In the past, compounds having a nitro, nitroso, quinoid, phenolic, hydroxy, or amino group have been used as inhibitors for older, well-known monomers such as styrene, alpha-methylstyrene, vinyl acetate, acrylic esters, and other unsaturated compounds with some success.

However, many of these materials are relatively ineffective as inhibitors for 1-vinyl-2-pyrrolidone which is a new monomer and quite different from the older, unsaturated compounds given above. For example, amines, including ammonia, which are known as inhibitors for the older monomers are activators for the polymerization of 1-vinyl-2-pyrrolidone and have been used to prepare 1-vinyl-2-pyrrolidone polymers. Hydroxy compounds such as methyl and butyl alcohol fail to act as inhibitors. Methylene blue and chloranil discolor the monomer. In addition, many of these soluble inhibitors are rather difficult to remove from the monomer.

According to the present invention, it is now found that various hydroxides, alkoxides, sulfides, and carbonates of alkali metals which are substantially insoluble in 1-vinyl-2-pyrrolidone are far more effective and satisfactory as inhibitors for 1-vinyl-2-pyrrolidone than the soluble inhibitors previously recommended for the older, well-known monomers. It is now found that the addition of small amounts of one or more of these inhibitors which are substantially insoluble in the monomer will effectively prevent autopolymerization of the 1-vinyl-2-pyrrolidone for a considerable period of time on storage at room temperature or at elevated temperatures. It has also been found that small additions of these substantially insoluble inhibitors will effectively prevent mass polymerization in the pot during the distillation of the monomer.

In practising the invention, the freshly distilled 1-vinyl-2-pyrrolidone is poured into a suitable container and 0.001 to 5% but preferably 1.01 to 1% of one or more of the various inhibitors of the invention is added to the monomer and the container sealed. In addition 0.001 to 5% but preferably 0.01 to 1.0% of the various inhibitors listed alone may be added to crude 1-vinyl-2-pyrrolidone prior to distillation to obtain the pure monomer and prevent mass polymerization occurring in the pot during distillation. A similar addition may be made to relatively pure monomer should it be found necessary for some reason, such as objectionable color or impurities, to redistill the monomer.

The stabilized 1-vinyl-2-pyrrolidone may either be distilled, decanted, or filtered to remove these substantially insoluble inhibitors from the monomer prior to its use in a polymerization reaction. A particular advantage of using these materials as inhibitors for 1-vinyl-2-pyrrolidone is that being substantially insoluble in the monomer they are easily removed simply by decanting or filtering the monomer prior to its polymerization whereas monomers containing soluble inhibitors must generally be distilled.

The following examples are offered as the best method now known of practising the invention, but are not intended to impose any limitation upon the claims.

EXAMPLE 1

*Test procedure.*—Autopolymerization of 1-vinyl-2-pyrrolidone with and without inhibitors was followed by means of viscosity increase of the various test compositions. Autopolymerization of 1-vinyl-2-pyrrolidone, with or without added inhibitors, produces an increase in the viscosity of the solution. This increase in viscosity is easily measured and as the polymerization increases until a gel or hard mass is obtained so does the viscosity slowly or rapidly increase and the increase is readily followed. Thus, a suitable inhibitor will maintain the viscosity of 1-vinyl-2-pyrrolidone at about 2 centipoises for a rather long period of time and any increase in this viscosity is a measure of the polymerization of the monomer. This method of testing the various inhibitors has worked out very satisfactorily.

A newly distilled sample of 1-vinyl-2-pyrrolidone was used in these preliminary tests. Analytical data supplied on this sample were as follows:

*1-Vinyl-2-Pyrrolidone, Pure*

| | |
|---|---|
| Percent 1-vinyl-2-pyrrolidone | 99.0. |
| Percent polymer | nil. |
| Percent aldehyde | 0.14. |
| Percent water | 0.029. |
| Percent iron | 0.0006. |
| $n_D^{25}$ | 1.5109. |
| $d^{26}$ | 1.0404 g./ml. |
| Freezing point | 13.7° C. |
| Viscosity | 2.06 cp. |
| Color | Water-white. |

Sodium hydroxide pellets, sulfur, copper powder, and sodium methoxide were added as given below:

The following solution was prepared:

| | G. |
|---|---|
| 1-vinyl-2-pyrrolidone | 100 |
| Benzoyl peroxide | 0.25 |

Then 20 ml. (20 g.) of this solution was measured into a graduate and then poured into a 20 x 150 mm. Pyrex test tube. One sodium hydroxide pellet (about 0.05 gram) was added to the solution, and the test tube was corked and numbered for identification.

In like manner, to 20 ml. (20 g.) of 1-vinyl-2-pyrrolidone +0.25% benzoyl peroxide contained in various test tubes was added 0.01 gram (about 0.05%) of sulfur, copper powder and sodium methoxide following which the test tubes were corked and numbered. This amount of inhibitor (0.01 g.) was the smallest amount that could be weighed on the balance used.

The various test compositions were then stored in a circulating-air oven at 70° C. At various intervals of time, all test compositions which were stored in the oven at 70° C. were cooled to room temperature and their kinematic viscosity in centipoises at room temperature were determined against Gardner-Holdt standard varnish viscosity tubes ranging in kinematic viscosity from 14 to 100,000 centipoises. The test compositions were then returned to the oven for further heating until the next time interval. This cycle was generally repeated until the sample was depleted, polymerized to a hard mass, or until an arbitrarily chosen time limit was reached.

The results obtained are listed in Table 1 and clearly show that additions of sodium methoxide and sodium hydroxide are highly efficient as inhibitors for 1-vinyl-2-pyrrolidone.

The results obtained are given in Table 2 and clearly show that additions of sodium methoxide or sodium sulfide are much more efficient as inhibitors for 1-vinyl-2-pyrrolidone than any of the soluble inhibitors evaluated.

TABLE 2.—EFFECT OF VARIOUS INHIBITORS ON THE POLYMERIZATION OF 1-VINYL-2-PYRROLIDONE AT 70° C.
[A. 1-vinyl-2-pyrrolidone—0.25% benzoyl peroxide—0.01% inhibitor heated at 70°C.[1]]

| Inhibitor | Time of heating | | | | | | | | | | | | | |
|---|---|---|---|---|---|---|---|---|---|---|---|---|---|---|
| | Hours | | | | Days | | | | | | Weeks | | Months | |
| | 0 | 2 | 4 | 8 | 1 | 2 | 3 | 4 | 5 | 6 | 1 | 2 | 1 | 2 |
| | Approximate viscosity (centipoises)[2] | | | | | | | | | | | | | |
| 1. 1-vinyl-2-pyrrolidone control [3] | <14 | <14 | <14 | <14 | 25 | 32 | 60 | 75 | 100 | 125 | 175 | 275 | 300 | 375 |
| 2. Sodium methoxide | <14 | <14 | <14 | <14 | <14 | 32 | 50 | 50 | 50 | 50 | 50 | 75 | 100 | 125 |
| 3. Sodium sulfide fused flakes | <14 | <14 | <14 | <14 | <14 | 14 | 25 | 25 | 25 | 25 | 25 | 32 | 32 | 32 |
| 4. Sodium bisulfite | <14 | <14 | <14 | <14 | 200 | 10,000 | 40,000 | | | | | | | |
| 5. Sodium metabisulfite | <14 | <14 | <14 | <14 | 125 | 3,600 | 17,000 | 30,000 | 55,000 | | | | | |
| 6. ½ sulfur–½ sodium methoxide | <14 | <14 | <14 | <14 | <14 | <14 | <14 | <14 | <14 | <14 | <14 | <14 | <14 | <14 |
| 7. ½ sodium methoxide–½ sodium bisulfite | <14 | <14 | <14 | <14 | <14 | 20 | 25 | 40 | 50 | 50 | 50 | 75 | 75 | 75 |
| 8. ½ sodium methoxide–½ sodium metabisulfite | <14 | <14 | <14 | <14 | <14 | 14 | 32 | 50 | 50 | 50 | 50 | 75 | 75 | 3,600 |
| 9. ½ sodium methoxide–½ sodium thiosulfate | <14 | <14 | <14 | <14 | 14 | 25 | 32 | 32 | 32 | 32 | 32 | 50 | 50 | 50 |
| 10. ½ sulfur–½ pyrogallol | <14 | <14 | <14 | <14 | <14 | <14 | <14 | <14 | <14 | <14 | <14 | <14 | 14 | 50 |
| 11. ½ sulfur–½ thiourea | <14 | <14 | <14 | <14 | <14 | <14 | <14 | <14 | <14 | <14 | <14 | <14 | <14 | <14 |

[1] Formula:
1-vinyl-2-pyrrolidone _____ cc__ 40
Benzoyl peroxide _____ percent 0.25
Inhibitor _____ do__ 0.01

[2] Gardner-Holdt viscosity.
[3] 1-vinyl-2-pyrrolidone—pure.
Note.—<=Less than.

EXAMPLE 2

The insoluble inhibitor compositions were prepared by measuring 40 ml. (40 g.) of 1-vinyl-2-pyrrolidone +0.25% benzoyl peroxide into a 25 x 150-mm. Pyrex test tube and 0.02 g. (0.05%) of the insoluble inhibitor was added. Where a combination of two inhibitors was used, 0.01 g. of each inhibitor was separately weighed out on a torsion balance and added to the monomer. The test tube was then corked and numbered.

These compositions were stored in a circulating-air oven at 70° C. They were then periodically removed, cooled to room temperature, the viscosity measured, and returned to the oven as previously given.

EXAMPLE 3

*Evaluation of the Most Promising Inhibitors*

Additional data were obtained on what appeared to be the most promising inhibitors based on the results obtained in Examples 1 and 2. A typical plant sample of monomer prepared by flash distillation at 50 mm. and 125° C. was used.

A sample of this material was analyzed with the following results:

*1-Vinyl-2-Pyrrolidone, Pure*

Percent 1-vinyl-2-pyrrolidone _____ 99.5%.
Percent polymer _____ None.
Percent aldehyde (as acetaldehyde) _____ 0.003.
$n_D^{25}$ _____ 1.5103.
Freezing point _____ 12.54° C.
Color _____ Water-white.

These test compositions were prepared by measuring 20 ml. (20 g.) of the above plant sample of 1-vinyl-2-pyrrolidone alone into a 20 x 150-mm. Pyrex test tube.

TABLE 1.—EFFECT OF VARIOUS INHIBITORS ON THE POLYMERIZATION OF 1-VINYL-2-PYRROLIDONE AT 70° C.
[A. 1-vinyl-2-pyrrolidone—0.25% benzoyl peroxide—0.01% inhibitor heated at 70° C.[1]]

| Inhibitor | Time of heating | | | | | | | | | | | | | |
|---|---|---|---|---|---|---|---|---|---|---|---|---|---|---|
| | Hours | | | | Days | | | | | | Weeks | | Months | | |
| | 0 | 2 | 4 | 8 | 1 | 2 | 3 | 4 | 5 | 6 | 1 | 2 | 1 | 2 | 3 |
| | Approximate viscosity (centipoises)[2] | | | | | | | | | | | | | | |
| 1. 1-vinyl-2-pyrrolidone control [3] | <14 | <14 | <14 | 14 | 50 | 190 | 700 | 1,500 | 2,500 | | | | | | |
| 2. Sodium methoxide | <14 | <14 | <14 | <14 | <14 | 14 | 20 | 20 | 20 | 20 | 20 | 25 | 32 | 32 | 60 |
| 3. Sodium hydroxide pellets | <14 | <14 | <14 | <14 | 14–32 | 32 | 50 | 50 | 50 | 50 | 50 | 75 | 75 | 75 | |
| 4. Thiourea | <14 | <14 | <14 | <14 | <14 | <14 | <14 | <14 | 50 | 175 | 900 | 5,000 | | | |
| 5. Copper powder | <14 | <14 | <14 | 14 | 50 | 175 | 350 | 500 | 1,300 | | | | | | |

[1] Formula:
1-vinyl-2-pyrrolidone _____ cc__ 20
Benzoyl peroxide _____ percent 0.25
Inhibitor _____ do__ 0.01

[2] Gardner-Holdt viscosity.
[3] 1-vinyl-2-pyrrolidone—pure.
Note.—<=Less than.

The inhibitor (0.05 g.) was then separately weighed out and added to the monomer. In those cases where sulfur was used with another inhibitor, 0.03 g. of sulfur and 0.02 g. of the other inhibitor were separately weighed out and added to the monomer. The test tube was then corked, shaken, and numbered. The various compositions were then stored in a circulating-air oven at 70° C. They were periodically removed from the oven, cooled to room temperature, the viscosity measured, and returned to the oven.

The results of these tests are given in Table 3 and clearly show the efficacy with which sodium methoxide, sodium hydroxide, and sodium sulfide act to prevent the autopolymerization of 1-vinyl-2-pyrrolidone as compared to soluble inhibitors such as sulfur and thiourea.

The plant sample of 1-vinyl-2-pyrrolidone described in Example 3 was used in these tests.

The compositions were prepared as follows:

(a) Addition of 0.02% inhibitor.

In this case, 0.01 g. of inhibitor was separately weighed out on a torsion balance and added to a 25 x 200-mm. Pyrex test tube. The sodium hydroxide pellets were crushed with a mortar and pestle to get the exact weight of material needed. Then 50 ml. (50 g.) of the plant sample of 1-vinyl-2-pyrrolidone was measured into the 25 x 200-mm. Pyrex test tube which was then corked and numbered.

(b) Addition of 0.05, 0.10, and 0.25% inhibitor.

The procedure used was the same as that given above with the exception that 40 ml. (40 g.) of 1-vinyl-2-pyrrolidone was used, and the amount of inhibitor added was based on this amount of monomer.

TABLE 3.—EFFECT OF VARIOUS INHIBITORS ON THE POLYMERIZATION OF 1-VINYL-2-PYRROLIDONE AT 70 °C.
[A. 1-vinyl-2-pyrrolidone—0.25% inhibitor heated at 70°C.[1]]

| Inhibitor | Time of heating | | | | | | | | | | | |
|---|---|---|---|---|---|---|---|---|---|---|---|---|
| | Days | | | | | Weeks | | | Months | | | |
| | 0 | 1 | 2 | 3 | 4 | 1 | 2 | 5 | 2 | 3 | 4 | 5 |
| | Approximate viscosity (centipoises)[2] | | | | | | | | | | | |
| 1. 1-vinyl-2-pyrrolidone alone [3] | <14 | <14 | <14 | 32 | 75 | 125 | 175 | Hard polymer formed | | | | |
| 2. Sodium methoxide | <14 | <14 | <14 | <14 | <14 | <14 | <14 | <14 | <14 | <14 | <14 | <14 |
| 3. Sodium hydroxide pellets | <14 | <14 | <14 | <14 | <14 | <14 | <14 | <14 | <14 | | | |
| 4. Sodium sulfide fused flakes | <14 | <14 | <14 | <14 | <14 | <14 | <14 | <14 | <14 | 14 | 14 | 14 |
| 5. Thiourea | <14 | <14 | <14 | <14 | <14 | <14 | <14 | <14 | 14 | 75 | 275 | 1,200 |
| 6. Sulfur | <14 | <14 | <14 | <14 | 14 | 425 | 4,500 | 40,000 | | | | |
| 7. ⅗ sulfur-⅖ sodium methoxide | <14 | <14 | <14 | <14 | 14 | 425 | 4,500 | 40,000 | 14 | 75 | 275 | 1,200 |
| 8. ⅗ sulfur-⅖ pyrogallol | <14 | <14 | <14 | <14 | 14 | 425 | 75 | 1,500 | 3,200 | 4,600 | | |
| 9. ⅗ sulfur-⅖ thiourea | <14 | <14 | <14 | <14 | 14 | 425 | <14 | 100 | 175 | 425 | 500 | 900 |
| 10. ⅗ sulfur-⅖ sodium sulfide | <14 | <14 | <14 | <14 | 14 | 425 | <14 | <14 | <154 | <14 | <14 | <14 |

[1] Formula:
1-vinyl-2-pyrrolidone _____ cc __ 20
Inhibitor _____ percent __ 0.25
[2] Gardner-Holdt viscosity.
[3] 1-vinyl-2-pyrrolidone—pure.
Note.—<=Less than.

EXAMPLE 4

Tests were carried out as given in Table 4 to show the effect of additions of 0.02 to 0.25% of various inhibitors on the stability of 1-vinyl-2-pyrrolidone when stored at 70° C.

The results obtained are listed in Table 4 and clearly show that sodium methoxide, sodium hydroxide, and sodium sulfide are much more effective in preventing the autopolymerization of 1-vinyl-2-pyrrolidone than soluble inhibitors such as thiourea and pyrogallol.

TABLE 4.—EFFECT OF ADDITIONS OF 0.02, 0.05, 0.1 AND 0.25% OF VARIOUS INHIBITORS ON THE POLYMERIZATION OF 1-VINYL-2-PYRROLIDONE AT 70° C.
[A. 1-vinyl-2-pyrrolidone—0.02, 0.05, 0.1 and 0.25% inhibitor [1]]

| Inhibitor | Time of heating | | | | | | | | | | |
|---|---|---|---|---|---|---|---|---|---|---|---|
| | Days | | | | | Weeks | | Months | | | |
| | 0 | 1 | 2 | 3 | 4 | 1 | 2 | 1 | 2 | 3 | 4 |
| | Approximate viscosity (centipoises)[2] | | | | | | | | | | |
| 1. 1-vinyl-2-pyrrolidone [3] | <14 | 25 | 45 | 60 | 90 | 100 | 175 | 250 | 300 | 325 | 400 |
| 0.02% Inhibitor Added | | | | | | | | | | | |
| 2. Sodium methoxide | <14 | <14 | <14 | <14 | <14 | <14 | <14 | <14 | <14 | <14 | <14 |
| 3. Sodium hydroxide pellets | <14 | <14 | <14 | <14 | <14 | <14 | <14 | <14 | <14 | <14 | <14 |
| 4. Sodium sulfide fused flakes | <14 | <14 | <14 | <14 | <14 | <14 | <14 | <14 | <14 | <14 | <14 |
| 5. Thiourea | <14 | <14 | <14 | <14 | <14 | <14 | <14 | <14 | <14 | 450 | 1400 |
| 6. Pyrogallol | <14 | <14 | 200 | 1,800 | 6,300 | 10,000 | 15,000 | 25,000 | 35,000 | 60,000 | |
| 0.05% Inhibitor Added | | | | | | | | | | | |
| 7. Sodium methoxide | <14 | <14 | <14 | <14 | <14 | <14 | <14 | <14 | <14 | <14 | <14 |
| 8. Sodium hydroxide pellets | <14 | <14 | <14 | <14 | <14 | <14 | <14 | <14 | <14 | <14 | <14 |
| 9. Sodium sulfide fused flakes | <14 | <14 | <14 | <14 | <14 | <14 | <14 | <14 | <14 | <14 | 14 |
| 10. Thiourea | <14 | <14 | <14 | <14 | <14 | <14 | <14 | <14 | <14 | <14 | <14 |
| 11. Pyrogallol | <14 | <14 | <14 | 90 | 600 | 2,000 | 7,000 | Gelled | Gelled | Gelled | Gelled |
| 0.1% Inhibitor Added | | | | | | | | | | | |
| 12. Sodium methoxide | <14 | <14 | <14 | <14 | <14 | <14 | <14 | <14 | <14 | <14 | <14 |
| 13. Sodium hydroxide pellets | <14 | <14 | <14 | <14 | <14 | <14 | <14 | <14 | <14 | <14 | <14 |
| 14. Sodium sulfide fused flakes | <14 | <14 | <14 | <14 | <14 | <14 | <14 | <14 | <14 | <14 | <14 |
| 15. Thiourea | <14 | <14 | <14 | <14 | <14 | <14 | <14 | <14 | <14 | <14 | 14 |
| 16. Pyrogallol | <14 | <14 | <14 | <14 | <14 | <14 | 125 | 900 | 1,500 | 1,800 | 2,500 |

See footnotes at end of table.

TABLE 4.—Continued

| Inhibitor | Time of heating | | | | | | | | | | |
|---|---|---|---|---|---|---|---|---|---|---|---|
| | Days | | | | | Weeks | | Months | | | |
| | 0 | 1 | 2 | 3 | 4 | 1 | 2 | 1 | 2 | 3 | 4 |
| | Approximate viscosity (centipoises) [2] | | | | | | | | | | |
| 0.25% INHIBITOR ADDED | | | | | | | | | | | |
| 17. Sodium methoxide | <14 | <14 | <14 | <14 | <14 | <14 | <14 | <14 | <14 | <14 | <14 |
| 18. Sodium hydroxide pellets | <14 | <14 | <14 | <14 | <14 | <14 | <14 | <14 | <14 | <14 | <14 |
| 19. Sodium sulfide fused flakes | <14 | <14 | <14 | <14 | <14 | <14 | <14 | <14 | <14 | <14 | <14 |
| 20. Thiourea | <14 | <14 | <14 | <14 | <14 | <14 | <14 | <14 | 14 | 40 | 75 |
| 21. Pyrogallol | <14 | <14 | <14 | <14 | <14 | <14 | <14 | <14 | <14 | <14 | <14 |

[1] Formula:
  A. 1-vinyl-2-pyrrolidone_____cc__ 50
    Inhibitor_____percent__ 0.02
  B. 1-vinyl-2-pyrrolidone_____cc__ 40
    Inhibitor_____percent__ 0.05, 0.1, and 0.25

[2] Gardner-Holdt viscosity.
[3] 1-vinyl-2-pyrrolidone—pure.
Note.—< = Less than.

EXAMPLE 5

A sample of 1-vinyl-2-pyrrolidone having the following analysis was used in these tests:

*1-Vinyl-2-Pyrrolidone, Pure*

| | |
|---|---|
| Percent 1-vinyl-2-pyrrolidone | 98.0. |
| Percent polymer | None. |
| Percent water | 0.002. |
| $n_D^{25}$ | 1.5101. |
| Color | Light yellow. |

Into several 25 x 150-mm. Pyrex test tubes there was measured 30 ml. (30 g.) of the above monomer. Then 0.03 g. of sodium carbonate or thiourea was weighed out and added to separate test tubes containing the monomer. The test tubes including a control containing no inhibitor were then corked and numbered. The compositions were placed in a circulating-air oven at 70° C., removed periodically, cooled to room temperature, the viscosity determined, and returned to the oven. The following results were obtained after the compositions had been stored for a period of 3 months at 70° C.

The control sample (no inhibitor added) had increased in viscosity to 125 cp.

The sample containing thiourea had likewise increased in viscosity to 125 cp. However, the sample containing sodium carbonate showed no increase in viscosity and thus was much more effective as an inhibitor than a soluble material like thiourea.

EXAMPLE 6

In order to show the efficacy with which additions of sodium methoxide, sodium hydroxide, and sodium sulfide act to prevent polymerization in the pot during distillation of 1-vinyl-2-pyrrolidone, the following compositions were prepared:

| | G. |
|---|---|
| 1-vinyl-2-pyrrolidone | 400 |
| Inhibitor | 0.4 |

The 1-vinyl-2-pyrrolidone was weighed into tared 8-oz. bottles following which the sodium methoxide, sodium hydroxide, or sodium sulfide were separately weighed out and added to the monomer. The bottles were capped, placed on a laboratory shaker, and shaken for one hour at room temperature. The samples were then distilled at 70–71° C. and 2-mm. to yield clear, water-white monomers having a refractive index ($n_D^{25}$) of 1.5110–1.5111. In no case was there any sign of polymerization in the distillation pot regardless of whether the monomer was inhibited with sodium hydroxide, or sodium sulfide.

While there are above disclosed but a limited number of embodiments of the process of the invention it is possible to provide still other embodiments without departing from the inventive concept herein disclosed, and it is therefore desired that only such limitations be imposed upon the appended claims as are stated therein or required by the prior art.

The invention claimed is:

1. The method of inhibiting the polymerization of monomeric 1-vinyl-2-pyrrolidone whereby it is maintained in monomer form during normal storage, which consists in the step of adding to monomeric 1-vinyl-2-pyrrolidone an autopolymerization inhibitor, insoluble in said monomeric 1-vinyl-2-pyrrolidone, selected from the group consisting of hydroxides, alkoxides, sulfides, and carbonates of alkali metals in an amount of from 0.001 to 5% by weight of said monomeric 1-vinyl-2-pyrrolidone.

2. The method of inhibiting the polymerization of monomeric 1-vinyl-2-pyrrolidone whereby it is maintained in monomer form during normal storage, which consists in the step of adding to monomeric 1-vinyl-2-pyrrolidone an autopolymerization inhibitor, insoluble in said monomeric 1-vinyl-2-pyrrolidone, selected from the group consisting of hydroxides, alkoxides, sulfides, and carbonates of alkali metals, in an amount of from 0.01 to 1% by weight of said monomeric 1-vinyl-2-pyrrolidone.

References Cited in the file of this patent

UNITED STATES PATENTS

| 2,317,804 | Reppe et al. | Apr. 27, 1943 |
| 2,824,105 | Smith et al. | Feb. 18, 1958 |

OTHER REFERENCES

Frank et al.: "J.A.C.S.," vol. 68, page 908 (1946).

Dunbrook: Chemical Abstracts, vol. 42, cols. 8011 and 8012 (1948).